United States Patent
Szabad

[19]

[11] Patent Number: 5,928,045
[45] Date of Patent: Jul. 27, 1999

[54] CONTINUOUS RAIL SPORTS BOARD AND METHOD

[75] Inventor: Gregory L. Szabad, Oceanside, Calif.

[73] Assignee: Earth & Ocean Sports, Inc., Hyannis, Mass.

[21] Appl. No.: 09/021,774

[22] Filed: Feb. 11, 1998

Related U.S. Application Data

[60] Provisional application No. 60/037,505, Feb. 11, 1997.

[51] Int. Cl.⁶ ..................................... B63B 35/79
[52] U.S. Cl. .................. 441/74; 441/65; 280/602
[58] Field of Search .................. 441/65, 68, 74; 280/14.2, 610, 602; D21/766, 769

[56] References Cited

U.S. PATENT DOCUMENTS

| | | |
|---|---|---|
| 4,850,913 | 7/1989 | Szabad, Jr. . |
| 4,894,034 | 1/1990 | Brown, III . |
| 5,116,269 | 5/1992 | Moran . |
| 5,211,593 | 5/1993 | Scheider et al. . |

*Primary Examiner*—Jesus D. Sotelo
*Attorney, Agent, or Firm*—Richard P. Crowley

[57] ABSTRACT

A body or sports board having a continuous strip rail extending over the width of bevelled side, nose and side and optionally, also over the tail surfaces.

12 Claims, 3 Drawing Sheets

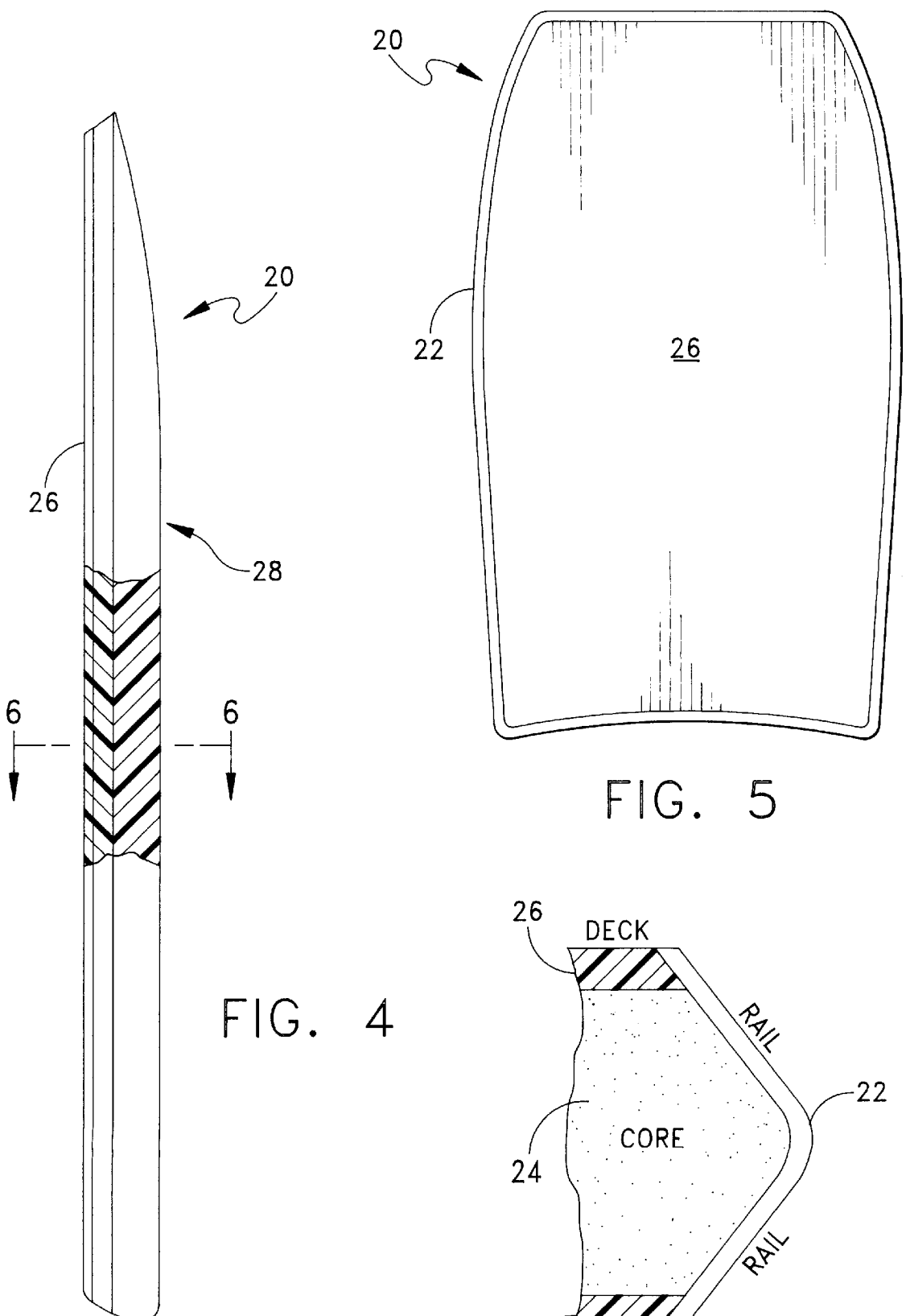
FIG. 4
FIG. 5
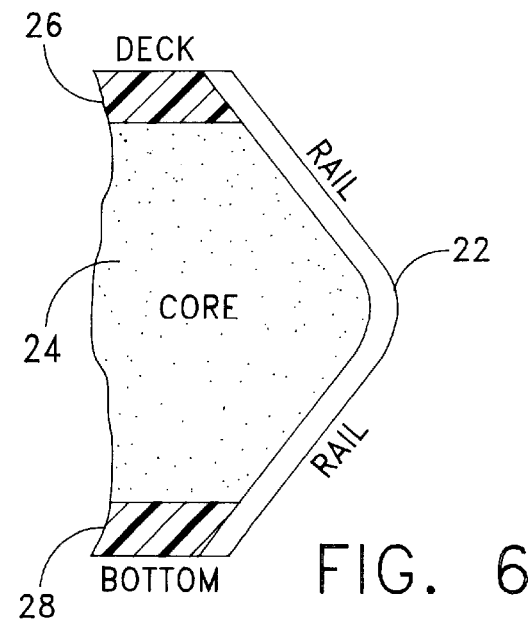
FIG. 6

CONTINUOUS RAIL SPORTS BOARD AND METHOD

REFERENCE TO PRIOR APPLICATION

This application incorporates by reference and claims the benefit of U.S. Provisional Application Serial No. 60/037,505, filed Feb. 11, 1997.

BACKGROUND OF THE INVENTION

Typically, sports or body boards are composed of a planar core material, for example, a closed cell foam material with sloped side rails meeting intermediate each side, and a nose section or chine area and a tail section, where the top surface of the board slopes downwardly at an angle to meet the bottom half of the board.

Sports boards, such as body and surf boards, are often composed of lightweight, foam core, top and bottom plastic film sections, with side rails heat-laminated to the top and bottom sections, and a slick, glossy, smooth plastic skin layer applied to the bottom board surface. U.S. Pat. No. 4,850,913, issued Jul. 25, 1989, discloses body boards with a slick film bottom, while U.S. Pat. No. 5,211,593, issued May 18, 1993, discloses the manufacture and structure of prior art body boards with a graphic imprinted skin.

In the use of sports boards, it is most desirable for the user to control or maneuver the board by gripping the nose and side areas of the board. U.S. Pat. No. 4,894,034, issued Jan. 16, 1990, discloses a body board with hand holds for a user, while U.S. Pat. No. 5,116,269, issued May 26, 1992, discloses a body board with contoured side grips for control. All of the above-mentioned U.S. patents are incorporated by reference to illustrate the manufacture and structure of prior art type sports boards.

U.S. Pat. Nos. 5,116,269 and 5,211,593, in particular, illustrate the prior art construction and method of laminating separate side strips of lower side and nose and tail rails. In practice, a plastic film is heat-laminated to the top surface of the core material to form a deck layer and then rolled over and heat-laminated to the bevelled, upper side rail surfaces on each opposing side. The bevelled lower side rail surfaces are repeatedly heat-laminated, as well as the nose and tail surfaces with separate plastic rail strips.

It is desirable to provide for a new and improved sport or body board and method of manufacture which overcomes some of the disadvantages of the prior art body-sports boards and to provide an improved method of manufacture and an improved sport or body board.

SUMMARY OF THE INVENTION

The invention relates to a full wrap, top deck to bottom, continuous rail board and method of manufacture and use. In particular, the invention concerns a foam sports board, such as a surfboard or body board, with the side-chine-side rail sections having and formed of a continuous, one piece rail strip secured to the lower and upper bevelled rail surfaces for better control and maneuverability of the board and to prevent water leakage into the board and for sealing the board.

The board supports a rider and may be used for gliding over water or snow. The board comprises an elongated, substantially planar flotation core material to support a rider. The board includes a top surface with a plastic laminated deck layer secured thereto; a bottom surface with a smooth plastic laminated bottom layer secured thereto; and a plastic layer secured bevelled tail section and a one piece plastic film rail strip secured to bevelled upper and lower opposing side and nose rail surfaces. The rail strip extends in width over the upper and lower side and nose surface to the top surface and bottom surface and extends continuously from one side of the side-tail, over the nose and to the other side of the side-tail, and the rail strip sealing engages to the top deck and bottom surfaces. The upper rail strip surfaces of the board are sanded surfaces.

The sports board provides a full wrap (deck to bottom) rail and a board without the prior art separately laminated nose chine strips and partial side rails, but rather a board having a continuous rail strip over the nose section. The continuous rail starts on one side of the tail and covers the entire side rail in width from deck to bottom, and extends in length continuously from the tail of the side rail, to nose, to the other side rail, to the tail, e.g., a rail-nose-rail configuration. Optionally the continuous rail may be extended to cover a complete rail-nose-rail-tail configuration of a sports board.

The employment of the continuous rail, for example, an arcuate, or preferably a sharp straight rail or other bevelled-type shape through the nose or chine section, and at least substantially over the sides, provides and enhances the user's performance, control and maneuverability of the board.

The continuous side rails carried over to the nose eliminates sharp corners at the nose-side intersections, and may provide in one embodiment a rounded corner, softer at the edges, for safer and better spin and other maneuvers. The continuous rail gives the rider-user a surer grip for board maneuvers and control. For example, when prone-riding the board, the rider steers the board by grasping the nose and one of the upper rails while applying pressure to the opposite rail to maneuver the board in the selected direction. The use of a continuous, single foam rail strip also is advantageous in providing a seamless middle for the sports board to prevent water leakage or absorption into the board interior, in that the rail strip is adhesively or heat-laminated in a water-sealing flush manner to the deck and bottom plastic layers. The use of a straight-sided, smooth, continuous closed cell foam rail about the nose and edge periphery of the board provides a better grip for the rider-user than the prior art sloped, intermediate, separate two or multiple strip rails.

In one preferred embodiment, the continuous rail strip is heat-laminated or otherwise secured to the side edges and over the nose section, with a slight rounding of the board inwardly from the side edges at the nose section.

The board may be formed, for example, of core material of any flotation, lightweight material, like a closed cell foam, e.g., 4 to 10 pcf, e.g., an olefin like polyethylene or a copolymer of an olefin-like ethylene and styrene in a polyolefin. The core material is designed or shaped like a board with a ninety degree cut line with excess material trimmed. A bottom, like a slick skin polymer bottom, may be laminated to the outer skin material, which is laminated to the core material.

The plastic or polymer layers used for the deck and bottom layers may vary and be single or multiple layers typically composed of molded or extruded thermoplastic material, such as olefin polymers like polyethylene and polypropylene films or foams. The deck and bottom plastic layers usually are secured by heating the foam core surface and also the foam plastic layer of the deck and bottom and pressing the layers to the core material.

A thin, single flexible strip of closed cell foam material, with an exterior surface shaped or curved as desired, is thin cut and then heat-laminated to the and over the bevelled side edges and nose section. The strip material extends in width from the top deck to the bottom and may be arcuately, outwardly curved at the upper-lower rail surface intersection generally uniformly from top deck to bottom for rider-grasping properties. For example, where the continuous step rail is to form three sides, i.e., side-nose-side, the rail material may be a closed cell, polyethylene foam supplied from a roll source and cut to length and width, range in thickness from about 3/16 inches and length of 8–10 feet. The rail strip material should be sufficiently thin and flexible to permit ease in handling and permit continuous heat lamination in position.

While the continuous rail has been described as having the same arcuate exterior shape, it is recognized that the side-rail shape may vary as desired and the shape in the nose section may be different or the same as the curvature and shape in the side rail sections. In one embodiment, the nose section extends straight across from the slightly tapered inward side edges of the board, with the board bottom surface extending slightly upwardly at the nose end for slightly less board thickness at the nose end. The general curvature of the side rails extends through the nose section.

In the manufacture of the board with a continuous rail strip, the plastic deck layer is not rolled over onto the upper rail surface, as in the prior art, but rather cut off or trimmed at the deck edge or extends slightly over the top surface of the core and is cut flush with the rail strip. The continuous rail strip is heat-laminated to the cut off bottom edge of the plastic bottom layer and thus extends to the plane of the bottom layer surface, and the upper portion of the rail strip extends to and seals against the lower edge of the deck layer surface. The tail surface typically may slope as a bevelled straight surface downwardly from the deck layer to the bottom layer, and as in the prior art, a separate rail strip may be heat-laminated to the tail-rail surface to complete the encasing of the core material or preferably the continuous rail strip extended over the tail surface, so that only a simple overlap or smooth matching seam between the repetitive ends of the rail strip is formed.

The board is prepared in one embodiment by the steps of cutting in the flotation material the board outline, and then shaping the desired nose curvature. A plastic film bottom layer, such as a smooth slick layer is heat-laminated to the bottom surface of the core and excess plastic film trimmed from the core. The selected angle or bevelling of the core is cut from the core to form the upper and lower side rail surfaces and the desired tail angled surface. The one piece rail strip is then unrolled to a selected length and cut. The rail strip is then heat-laminated, starting usually at the one side-tail intersection to the lower rail surface and extended from the start to the end of one side, over the nose section and to the tail-side intersection on the other side, or preferably to the start point and excess strip rail trimmed flush with the bottom slick layer.

The core is then turned over with the upper rail surface upward and the rail strip then heat-laminated to the upper rail surface of the side-nose-side and optionally the tail surface. The plastic film deck layer and any additional film or resin applied to the top surface of the core and excess extending deck layer material is trimmed off to the flush angle of the top rail surfaces.

Optionally, but preferably, the continuous upper rail surface with the rail strip is then sanded to sharpen the upper and lower rail surface intersection for better board performance and to make the surface with the deck layer flush for better sealing. The lower rail strip surface need not be sanded. Where the tail surface is not covered with the rail strip, then a separate tail and rail strip may be cut and heat-laminated in place.

In one embodiment, the core material would be a 4 to 10 pcf polyethylene, ethylene or styrene copolymer foam flotation material, the top deck layer composed of extruded polyethylene or cross-linked polyethylene, and the bottom layer of smooth surface polyethylene or an ionomer resin, like a SURLYN® resin (SURLYN® is a registered trademark of the Dupont Company of Wilmington, Del.). The rail strip may be polyethylene foam strip of 3/16 inch thickness and about 6 inches in width and cut to the desired length. While heat lamination, i.e., heating both core and strip rail surfaces and then laminating the surfaces together is preferred, it is recognized that adhesive or other securing methods and techniques may be employed.

The invention shall be described for the purposes of illustration only in connection with certain embodiments; however, it is recognized that those persons skilled in the art may make various additions, improvements, modifications and changes to the illustrated embodiments, without departing from the spirit and scope thereof.

BRIEF DESCRIPTION OF THE DRAWINGS

FIG. 4 is a side plan view with partial sectional view of another shaped board of the invention.

FIG. 5 is a top plan view of the board of FIG. 4.

FIG. 6 is an enlarged, fragmentary sectional view along line 6—6 of FIG. 4.

DETAILED DESCRIPTION OF THE EMBODIMENTS

Figure 1:
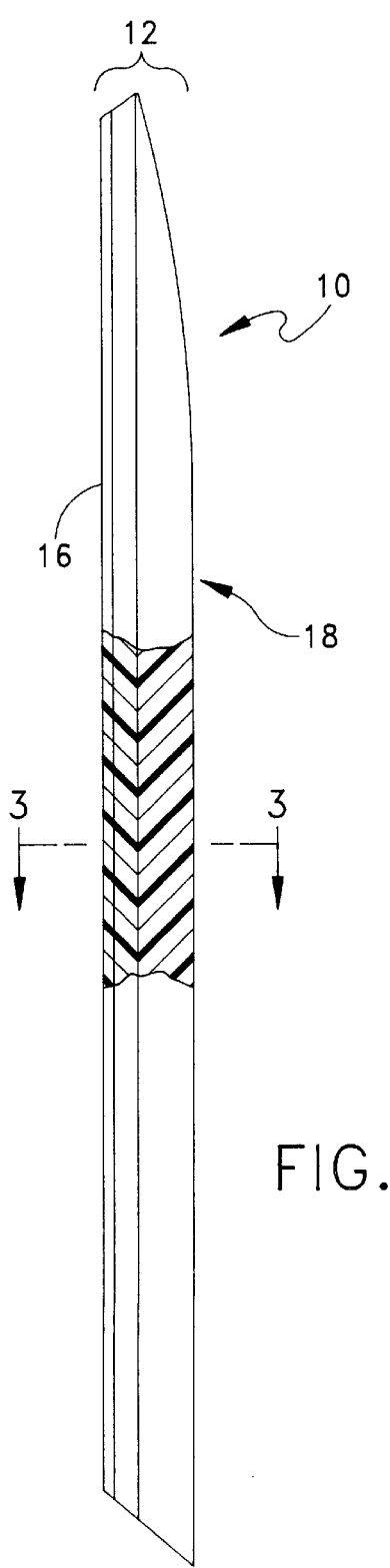
FIG. 1 is a side plan view with partial sectional view of a board of the invention.
Figure 2:
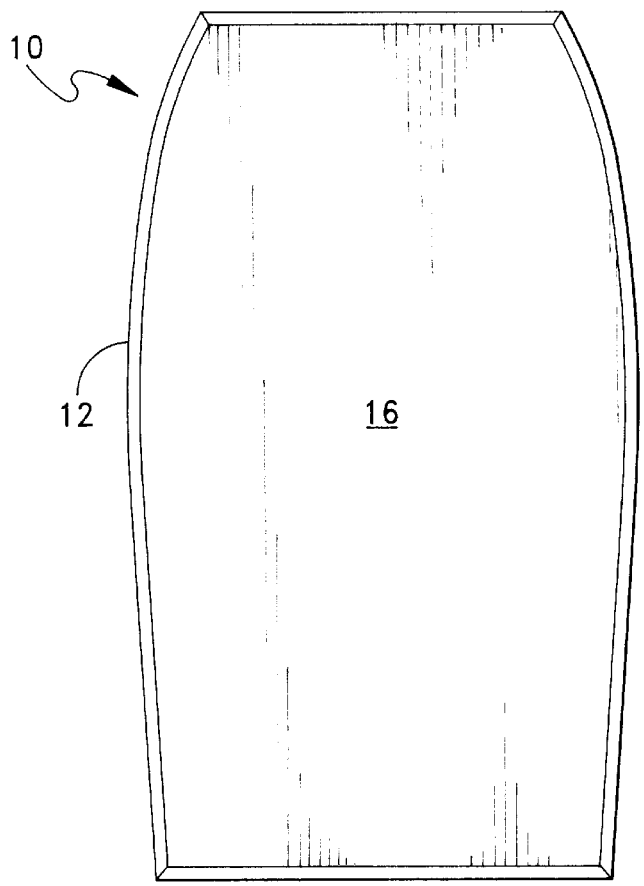
FIG. 2 is a top plan view of the board of FIG. 1.
Figure 3:
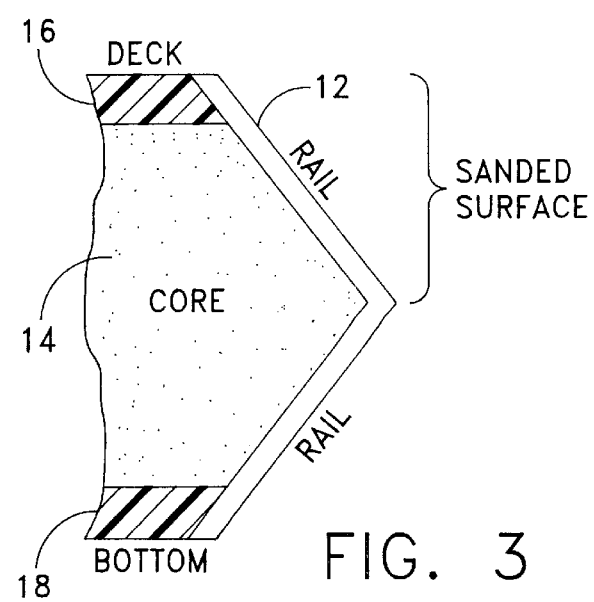
FIG. 3 is an enlarged, fragmentary sectional view along line 3—3 of FIG. 1.

In the Drawings, FIG. 1 shows a side elevational view of one shaped body board 10 of the invention with an angular configuration, where the entire side rail 12 is continuous along the total length and width of the board. FIG. 2 shows a plan view of the body board 10 with the continuous rail 12 covering the rail-nose-rail-tail of the board 10. FIG. 3 shows the body board 10 of FIG. 1 with the outer rail 12 covering the foam core 14, and with the deck layer 16 and bottom layer 18 laminated to and extending therefrom, and with a single, straight, bevelled tail section.

FIG. 3 shows the upper and lower straight, bevelled rail surfaces covered by the continuous rail strip 12, with the upper rail surface illustrated as a sanded surface, and with the rail strip 12 abutting and sealing against the flush lower surface of the deck layer 16 and extending over and bottom flush with the bottom layer 18.

FIG. 4 shows another side elevational view of a curved configuration of the body board 20 of the invention. FIG. 5 shows a continuous rail strip 22 covering the rail-nose-rail only, and not the tail section as in FIGS. 1–3 of the curved body board 20. FIG. 6 shows the body board 20 with the outer rail 22 having a curved or arcuate shaped configuration at the intersection of the upper and lower rail surfaces, and covering the foam core 24, and having a deck layer 26 and bottom layer 28 extending therefrom.

Figure 7:
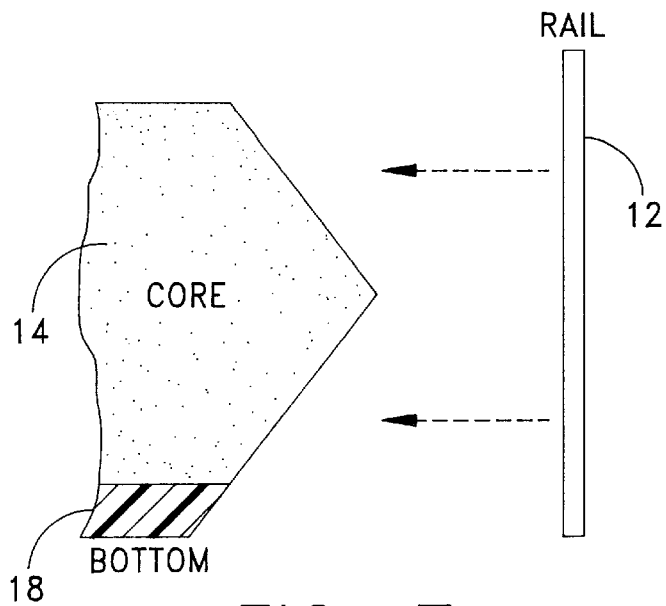
FIGS. 7, 8, and 9 are enlarged, fragmentary sectional views of the board of FIG. 1 in the steps of manufacture to arrive at FIG. 3.
Figure 8:
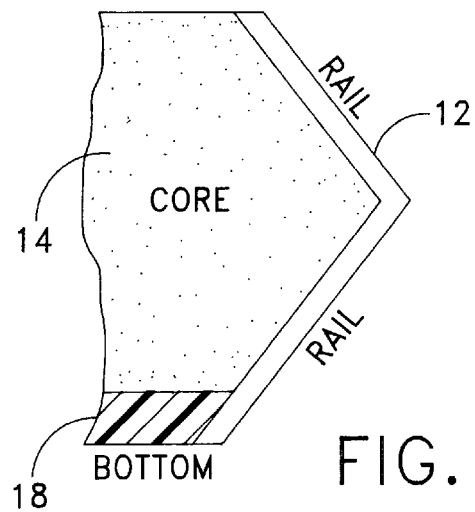
Figure 9:
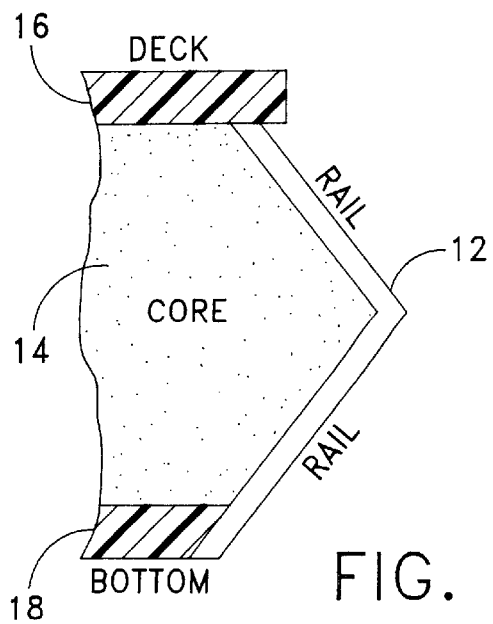

FIGS. 7–9 show steps in the manufacture of the board 10 and which lead to the configuration of FIG. 3. FIG. 7 illustrates the flat, flexible, foam rail strip 12 prior to heat lamination to the core 14, with the bottom slick layer already laminated and trimmed, and with the side rail of the foam core 14 cut to the desired angle. FIG. 8 illustrates the rail strip 12 after heat lamination to the cut upper and lower rail surfaces of the core 14. FIG. 9 shows the board 10 with the top deck layer 16 heat-laminated and extending over the rail strip and prior to trimming. On trimming of the excess deck layer and sanding, the board 10 is as illustrated in FIG. 3.

The board and method provides an improved, watertight board and with improved ride performance properties in use.

What is claimed is:

1. A board to support a rider for gliding over water or snow, which board comprises:
   a) an elongate, substantially planar, flotation core material to support a rider, and having a top surface with a plastic laminated deck layer secured thereto, a bottom surface with a smooth plastic laminated bottom layer secured thereto; and a plastic layer secured to a bevelled tail section; and
   b) a one piece, plastic film rail strip secured to bevelled upper and lower opposing side and nose rail surfaces, the rail strip extending in width over the upper and lower side and nose surface, to the top surface and bottom surface, and extending continuously from one side of the side-tail, over the nose, and to the other side of the side-tail and the rail strip sealing engaged to the top deck and bottom surfaces.

2. The board of claim 1 wherein the rail strip extends over and continuously about a tail-rail surface.

3. The board of claim 1 wherein the deck layer and bottom layer comprise heat-laminated, thermoplastic film layers flush with the rail strip.

4. The board of claim 1 wherein the bevelled upper and lower side rail surfaces intersect generally intermediate the width of the core material.

5. The board of claim 1 wherein the rail strip extends to and seals with an intersecting lower surface of the deck layer and extends over an intersecting lower edge of the bottom layer.

6. The board of claim 1 wherein the side rail surfaces are straight sides which intersect sharply at an intersect angle of about 90 to 120 degrees.

7. The board of claim 6 wherein the upper and lower side rails intersect generally intermediate the width of the core and the intersect is an arcuate shape.

8. The board of claim 6 wherein the intersecting upper and lower side rail surfaces are generally rounded at the intersection.

9. The board of claim 1 wherein the upper rail strip surfaces are sanded surfaces.

10. The method of manufacturing a board to support a rider for gliding over water or snow, which method comprises:
    a) providing an elongate, substantially planar, flotation core material to support a rider and having a top surface with a plastic laminated deck layer secured thereto, a bottom surface with a smooth plastic laminated bottom layer secured thereto; and a plastic layer secured to a bevelled tail section; and
    b) laminating a one piece, plastic film rail strip to bevelled upper and lower opposing side and nose rail surfaces, the rail strip extending in width over the upper and lower side and nose surface, to the top surface and bottom surface, and extending continuously from one side of the side-tail, over the nose, and to the other side of the side-tail and the rail strip sealing engaged to the top deck and bottom surfaces.

11. The method of claim 10 which includes:
    a) providing a core material with a laminated bottom layer and having bevelled upper and lower side rail and nose surfaces;
    b) applying the rail strip to the side rail and nose upper and lower bevelled surfaces; and
    c) applying the deck top layer to the top surface of the core material and extending over the edge of the upper rail strip; and
    d) trimming the excess deck layer to have the deck layer flush with the upper rail strip.

12. The method of claim 10 which includes sanding the upper bevelled rail surfaces.

* * * * *